(12) United States Patent
Kringstad

(10) Patent No.: US 9,272,592 B1
(45) Date of Patent: Mar. 1, 2016

(54) TOW HOOK CONNECTION SYSTEM

(71) Applicant: Safe-T-Pull, Inc, Park River, ND (US)

(72) Inventor: Jacob L. Kringstad, Hoople, ND (US)

(73) Assignee: Safe-T-Pull, Inc, Park River, ND (US)

( * ) Notice: Subject to any disclaimer, the term of this patent is extended or adjusted under 35 U.S.C. 154(b) by 0 days.

(21) Appl. No.: 14/550,255

(22) Filed: Nov. 21, 2014

(51) Int. Cl.
*B60D 1/56* (2006.01)

(52) U.S. Cl.
CPC ..................... *B60D 1/565* (2013.01)

(58) Field of Classification Search
CPC .......... B60D 1/52; B60D 1/485; B60D 1/488; B60D 1/565; B60D 1/56
See application file for complete search history.

(56) References Cited

U.S. PATENT DOCUMENTS

| | | | | |
|---|---|---|---|---|
| 2,712,452 A * | 7/1955 | Bennett | ................. | B60D 1/143 280/491.1 |
| 4,204,702 A * | 5/1980 | Oltrogge | ................. | B60D 1/075 280/491.5 |
| 5,054,806 A * | 10/1991 | Chester | ................. | B60D 1/04 280/495 |
| 6,158,760 A * | 12/2000 | Kiss | ................. | B60D 1/28 280/491.5 |
| 6,457,733 B1 * | 10/2002 | Hansen | ................. | B60D 1/075 280/481 |
| 6,851,695 B2 * | 2/2005 | Lindenman | ................. | B60D 1/015 248/231.9 |
| 6,902,183 B2 * | 6/2005 | Rodgers | ................. | B60D 1/00 280/504 |
| 2008/0143125 A1 * | 6/2008 | Nees | ................. | B60D 1/56 293/117 |
| 2012/0091691 A1 * | 4/2012 | Leinenger | ................. | B60D 1/04 280/504 |

* cited by examiner

*Primary Examiner* — Kevin Hurley
(74) *Attorney, Agent, or Firm* — Neustel Law Offices

(57) ABSTRACT

A tow hook connection system which may be universally and efficiently secured to a vehicle in a manner which reduces the risk of damaging the vehicle. The tow hook connection system generally includes a spread bar, a first connector, a second connector, and a tow member. The first and second connectors are adapted to be secured to a vehicle. The spread bar is secured between the first and second connectors, such as by fasteners and/or nuts. A tow member having a tow loop may be fixedly or removably secured to the spread bar. By connecting an object to the tow loop, the force of towing may be spread between the first and second connectors by the spread bar to reduce the risk of damage to the vehicle while towing.

17 Claims, 10 Drawing Sheets

TOW HOOK CONNECTION SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a tow hook and more specifically it relates to a tow hook connection system which may be universally and efficiently secured to a vehicle in a manner which reduces the risk of damaging the vehicle.

2. Description of the Related Art

Any discussion of the related art throughout the specification should in no way be considered as an admission that such related art is widely known or forms part of common general knowledge in the field.

Tow hooks are commonly used on a wide range of vehicles, from small ATV's to large semi-trucks. Conventional tow hooks can be difficult to install and operate. In the past, prior art tow hooks often include a single point of connection, which can cause damage to the vehicle or the vehicle's frame when heavy loads are towed or pulled. Because there is no uniform distribution of force, the single point of connection can also weaken the frame of the vehicle and reduce its durability. If a tow hook becomes dislodged or disconnected during use, it can result in injury to individuals or damage to property, including the object being towed or the vehicle itself.

Because of the inherent problems with the related art, there is a need for a new and improved tow hook connection system which may be universally and efficiently secured to a vehicle in a manner which reduces the risk of damaging the vehicle.

BRIEF SUMMARY OF THE INVENTION

The invention generally relates to a tow hook connection system which includes a spread bar, a first connector, a second connector, and a tow member. The first and second connectors are adapted to be secured to a vehicle. The spread bar is secured between the first and second connectors, such as by fasteners and/or nuts. A tow member having a tow loop may be fixedly or removably secured to the spread bar. By connecting an object to the tow loop, the force of towing may be spread between the first and second connectors by the spread bar to reduce the risk of damage to the vehicle while towing.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
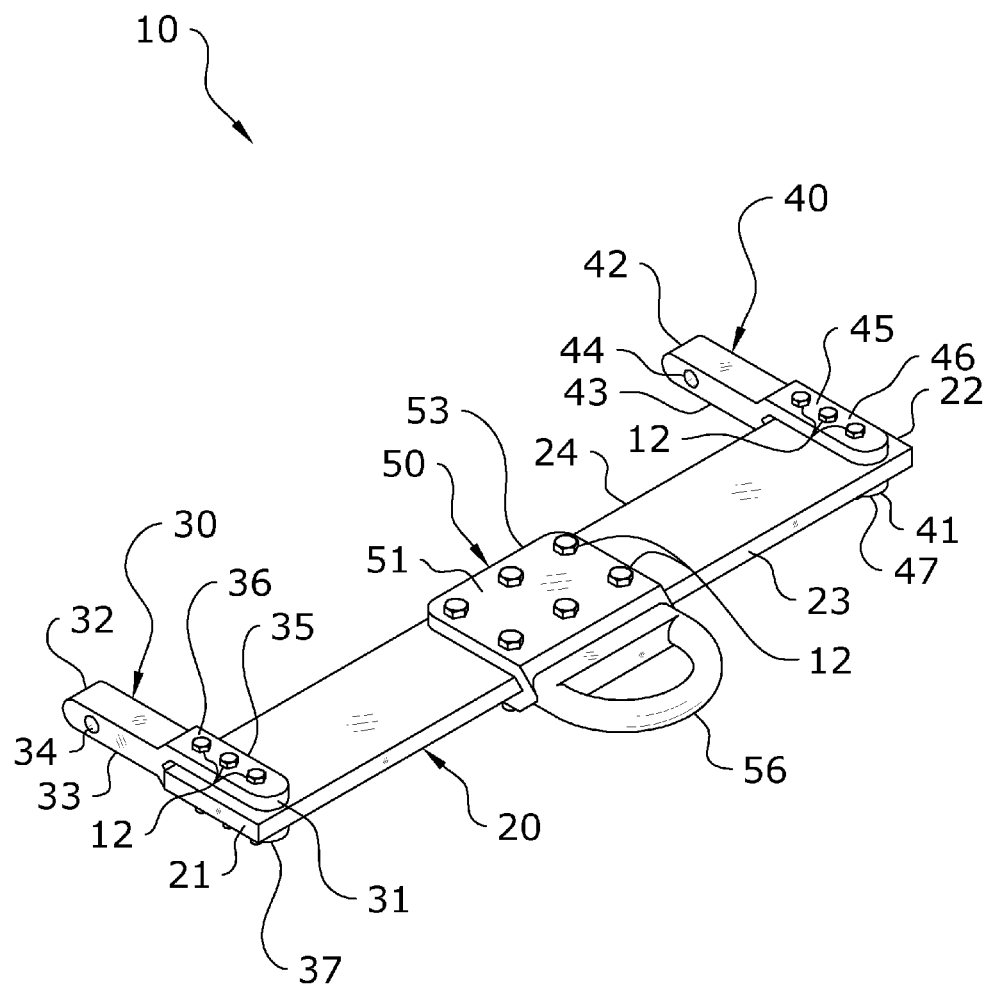
FIG. 1 is an upper perspective view of the present invention.
Figure 2:
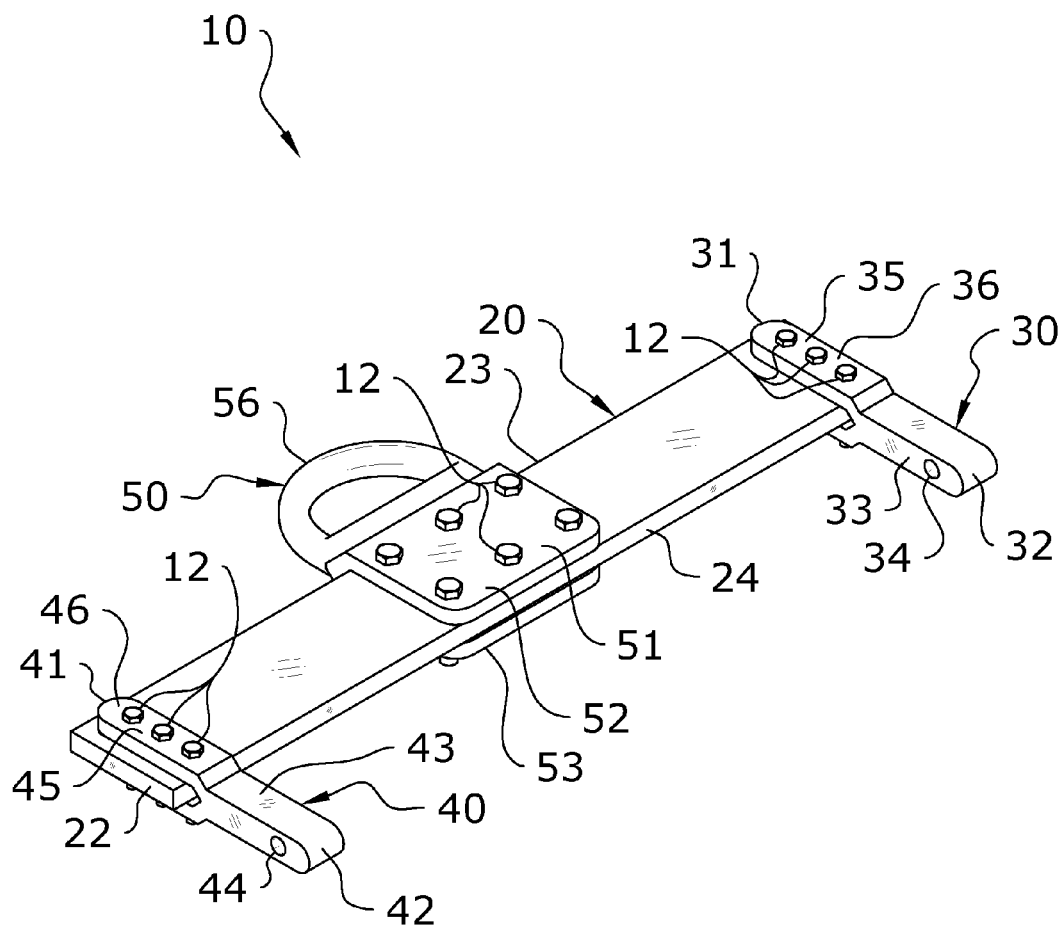
FIG. 2 is a lower perspective view of the present invention.

Turning now descriptively to the drawings, in which similar reference characters denote similar elements throughout the several views, FIGS. 1 through 10 illustrate a tow hook connection system 10, which comprises a spread bar 20, a first connector 30, a second connector 40, and a tow member 50. The first and second connectors 30, 40 are adapted to be secured to a vehicle 11. The spread bar 20 is secured between the first and second connectors 30, 40, such as by fasteners 12 and/or nuts 13. A tow member 50 having a tow loop 56 may be fixedly or removably secured to the spread bar 20. By connecting an object 15 to the tow loop 56, the force of towing may be spread between the first and second connectors 30, 40 by the spread bar 20 to reduce the risk of damage to the vehicle 11 while towing.

B. Spread Bar

As shown throughout the figures, the present invention includes a spread bar 20 which is attached to a vehicle 11 such as a truck via one or more connectors 30, 40 and includes a tow member 50 extending therefrom to be attached to various objects such as a hydraulic control system 15. The spread bar 20 may be comprised of various configurations, including the elongated bar configuration shown in the figures. It should be appreciated that the configuration, shape, and size of the spread bar 20 may vary and thus should not be construed as limited by the exemplary figures.

In the embodiment shown in the figures, the spread bar 20 includes a first side 21, a second side 22, a front end 23, and a rear end 24. The front end 23 of the spread bar 20 faces away from the vehicle 11 and is adapted to removably receive a tow member 50 as described herein. The rear end 24 of the spread bar 20 abuts against the truck 11 while the present invention is in use.

The first side 21 of the spread bar 20 includes a first connector 30 extending therefrom for securing the spread bar 20 to a first location on a vehicle 11. In some embodiments, the first connector 30 may be fixedly attached or integrally formed with the first side 21 of the spread bar 20. In other embodiments as shown in the figures, the first connector 30 may be removably attached to the first side 21 of the spread bar 20 via usage of fasteners 12 and nuts 13.

Figure 3:
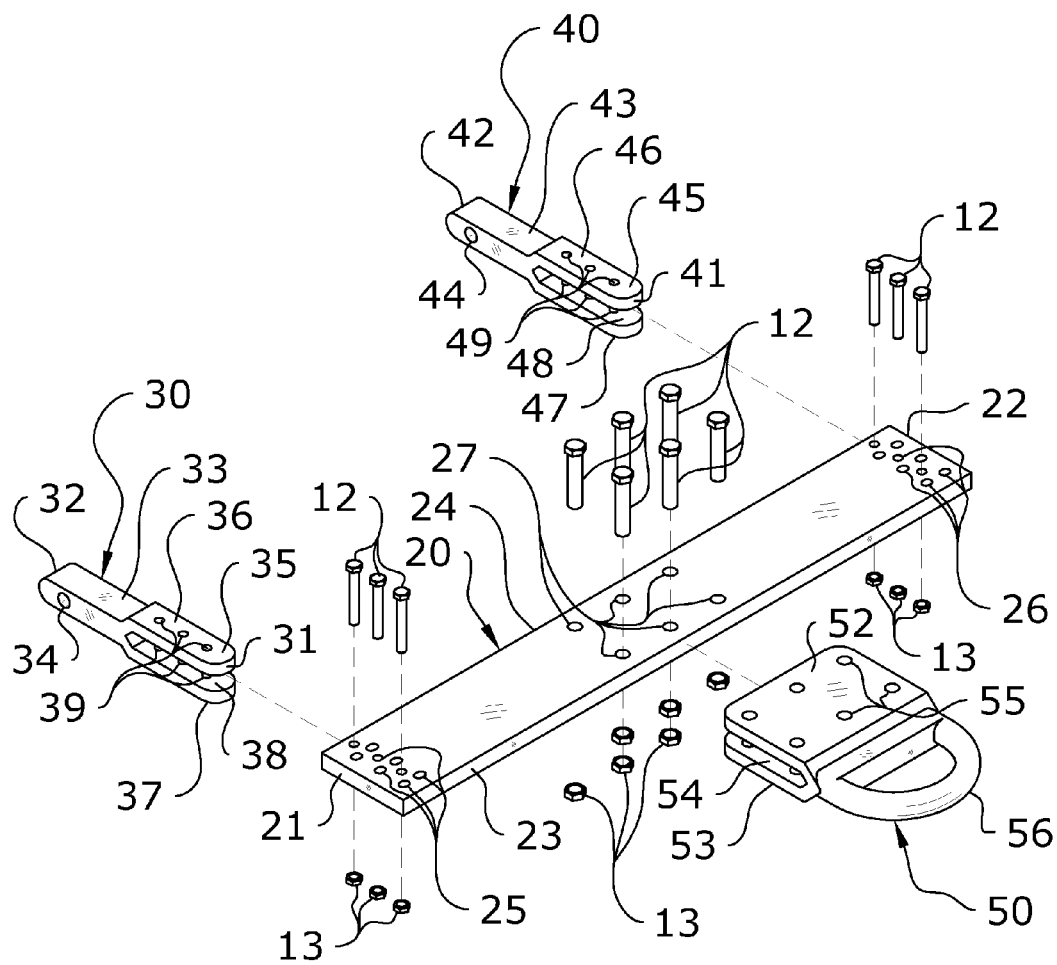
FIG. 3 is an exploded upper perspective view of the present invention.
Figure 4:
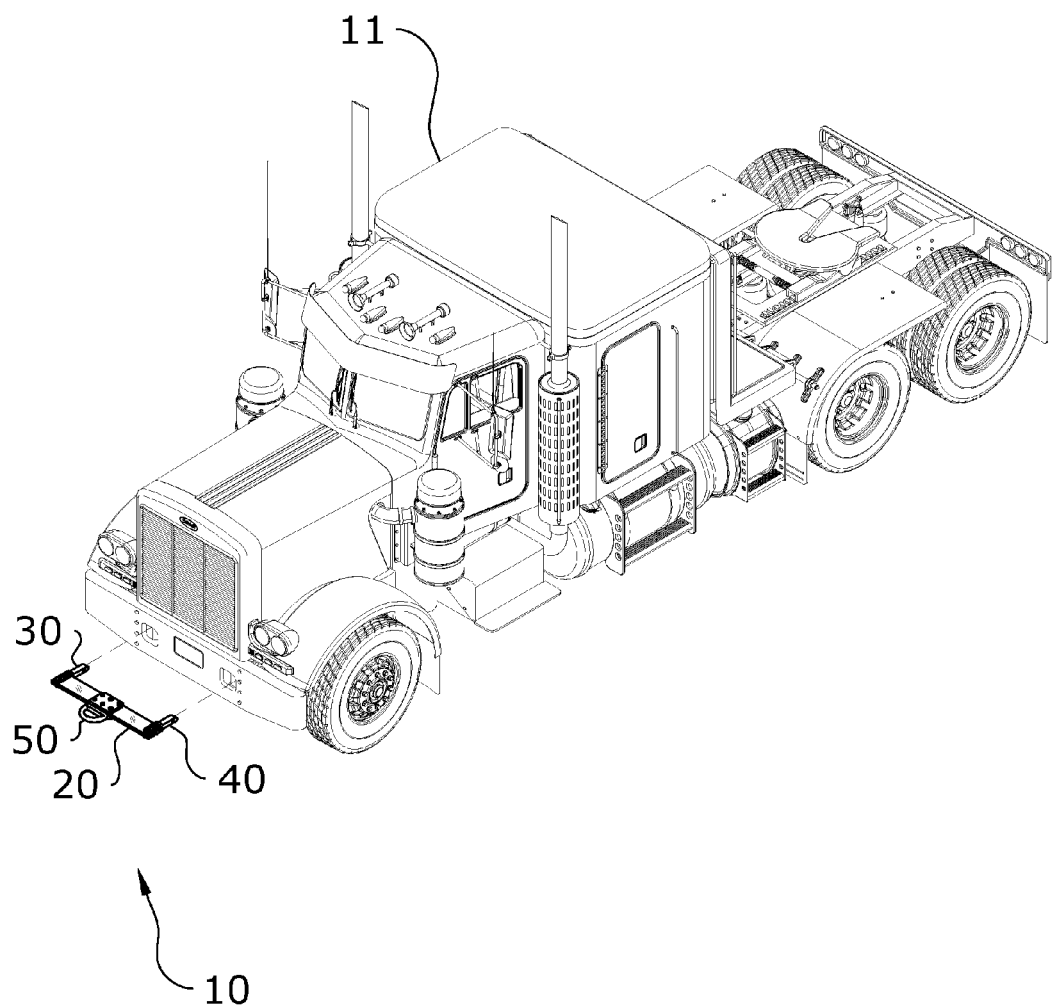
FIG. 4 is an upper perspective view of the present invention aligned for installation on a vehicle.
Figure 5:
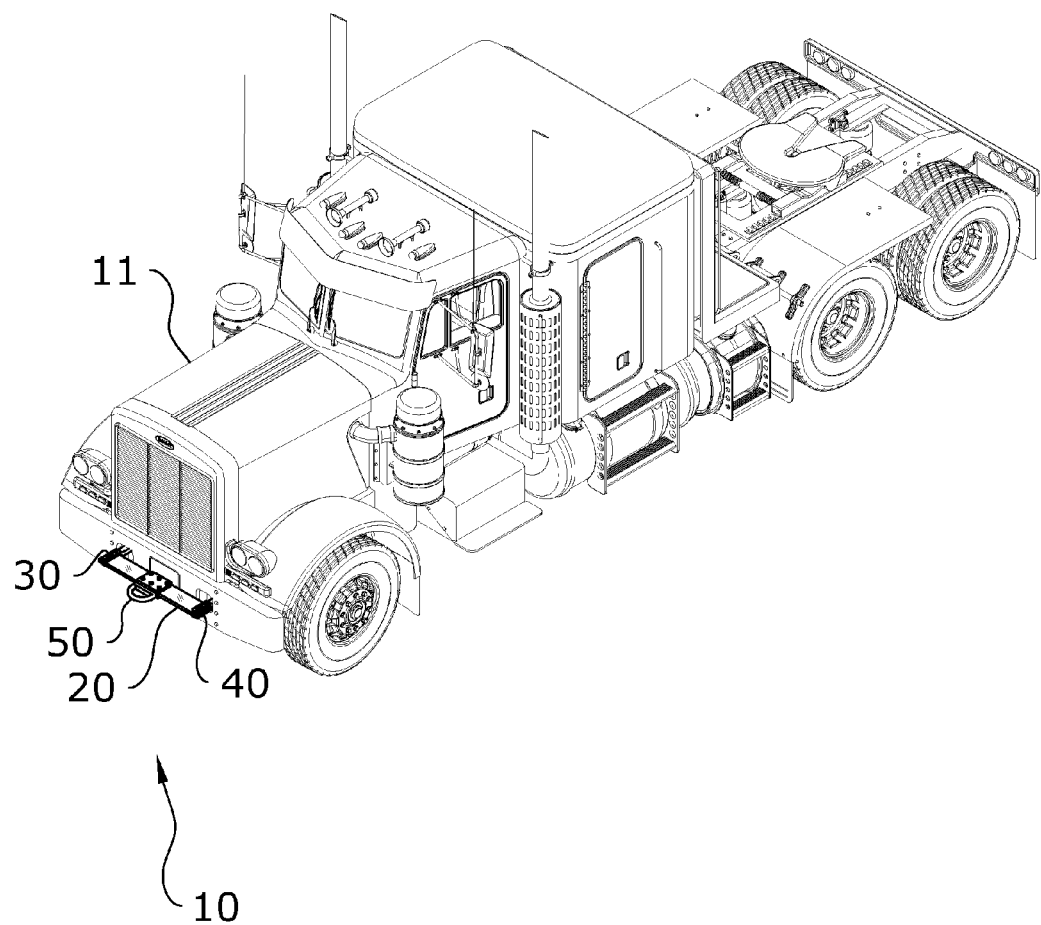
FIG. 5 is an upper perspective view of the present invention installed on a vehicle.
Figure 6:
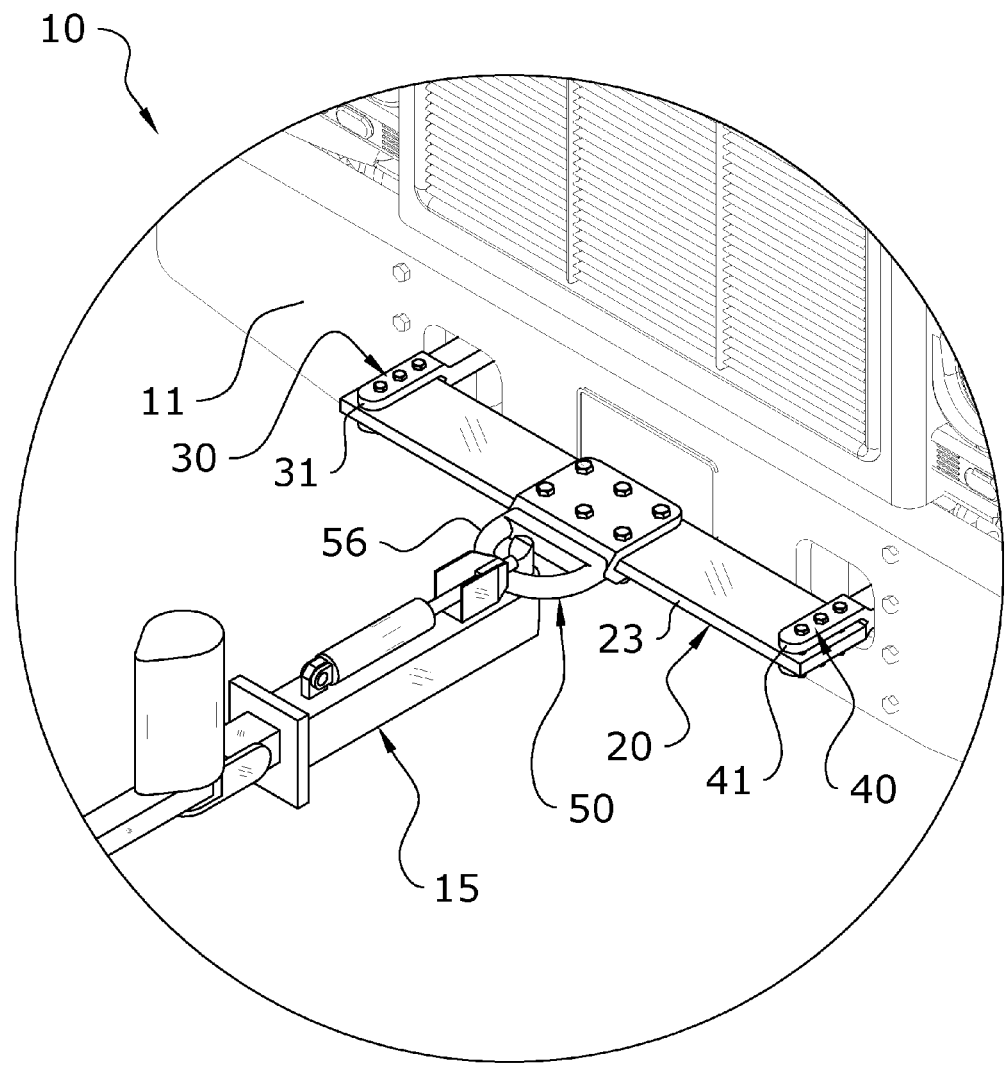
FIG. 6 is an upper perspective view of the present invention installed on a vehicle and connected to a towing object.
Figure 7:
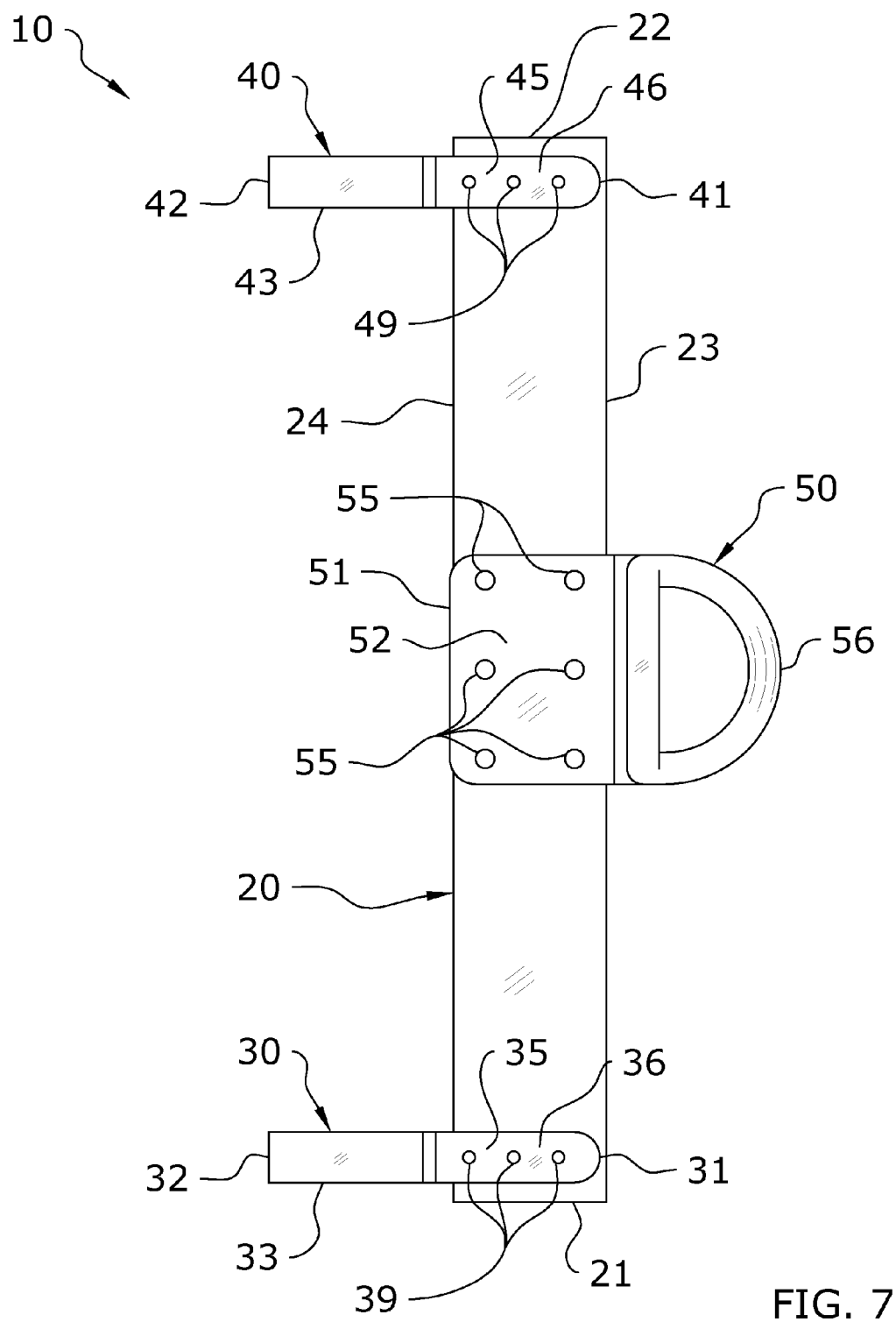
FIG. 7 is a top view of the present invention.
Figure 8:
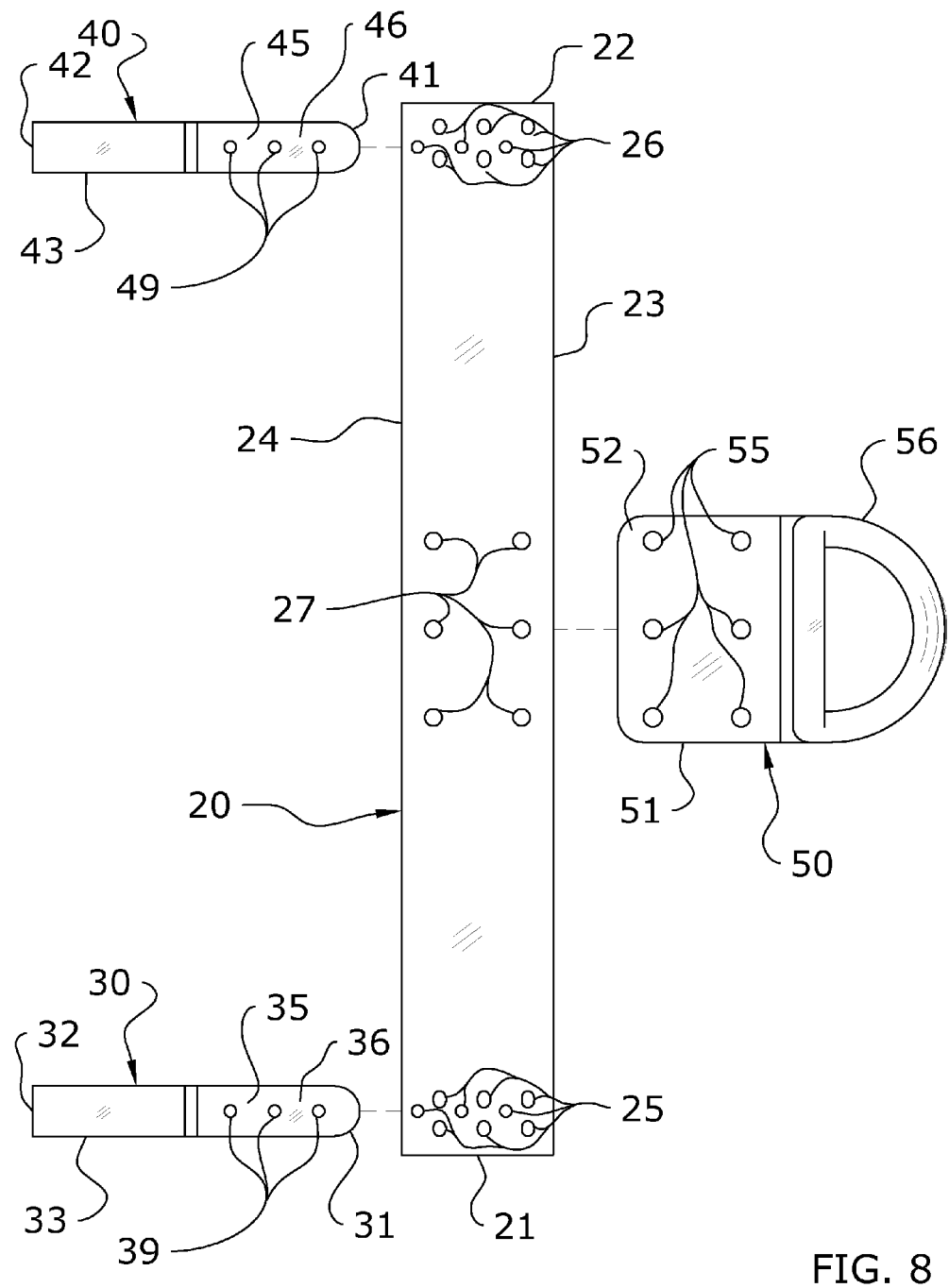
FIG. 8 is a top exploded view of the present invention.
Figure 9:
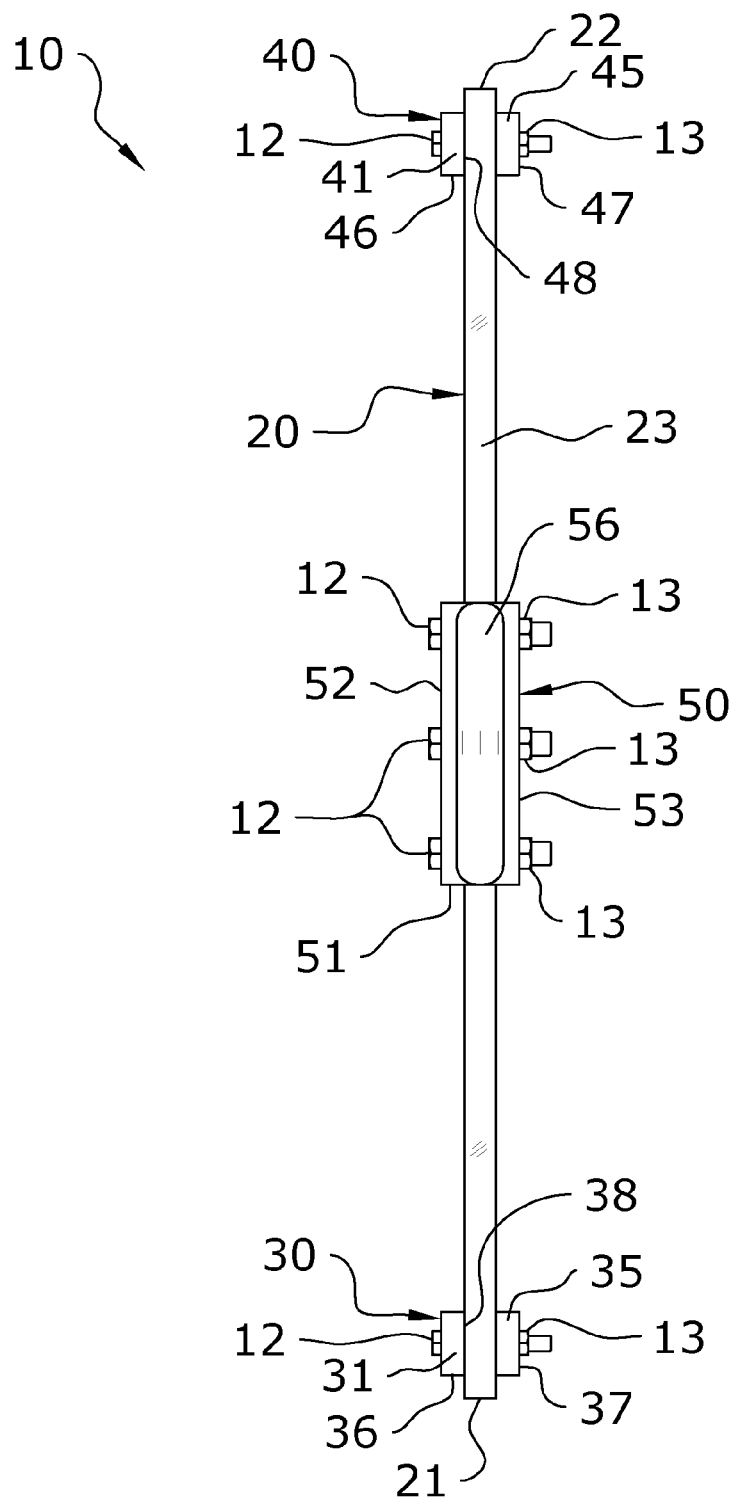
FIG. 9 is a frontal view of the present invention.
Figure 10:
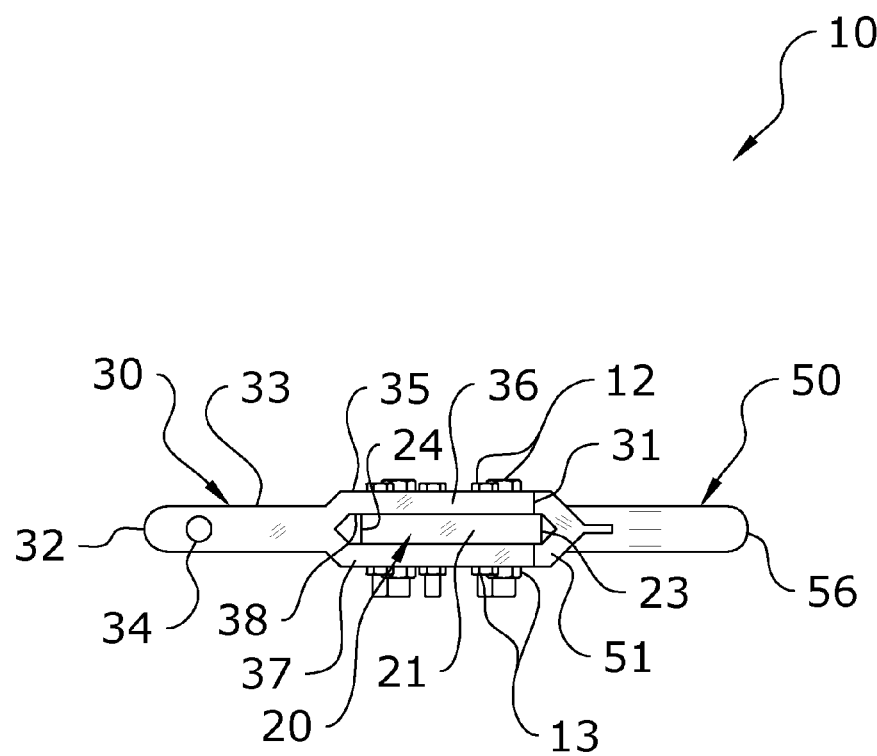
FIG. 10 is a side view of the present invention.

In embodiments having a removable first connector 30, the first side 21 of the spread bar 20 may include one or more first connector receivers 25. A preferred embodiment is best shown in FIG. 3, in which the first side 21 of the spread bar 20 includes a plurality of first connector receivers 25 comprised of multiple, parallel rows of receiver apertures adapted to receive fasteners 12 for securing the first connector 30 to the spread bar 20. The use of multiple rows of first connector receivers 25 allows for adjustment of the placement of the first connector 30 to suit different vehicle 11 types.

The second side 22 of the spread bar 20 includes a second connector 40 extending therefrom for securing the spread bar 20 to a second location on a vehicle 11. In some embodiments, the second connector 40 may be fixedly attached or integrally formed with the second side 22 of the spread bar 20. In other embodiments as shown in the figures, the second connector 40 may be removably attached to the second side 22 of the spread bar 20 via usage of fasteners 12 and nuts 13.

In embodiments having a removable second connector 40, the second side 22 of the spread bar 20 may include one or more second connector receivers 26. A preferred embodiment is best shown in FIG. 3, in which the second side 22 of the spread bar 20 includes a plurality of second connector receivers 26 comprised of multiple, parallel rows of receiver apertures adapted to receive fasteners 12 for securing the second connector 40 to the spread bar 20. The use of multiple rows of second connector receivers 26 allows for adjustment of the placement of the second connector 40 to suit different truck 11 types.

As best shown in FIG. 3, the central portion of the spread bar 20 may include one or more tow receivers 27. The tow receivers 27 are utilized to secure the tow member 50 to the spread bar 20 as shown in FIG. 1. Generally, the tow receivers 27 comprise apertures for receiving fasteners 12 to secure the tow member 50 to the spread bar 20. In a preferred embodiment, the tow receivers 27 comprise multiple rows of apertures to reinforce the connection between the tow member 50 and the spread bar 20.

C. Connectors

As shown throughout the figures, the present invention includes a plurality of connectors 30, 40 for securing the spread bar 20 to a vehicle 11. In a preferred embodiment, a first connector 30 is secured to a first side 21 of the spread bar 20 and a second connector 40 is secured to a second side 22 of the spread bar 20 as described herein. As mentioned, the connectors 30, 40 may be integrally formed with the spread bar 20 or may be removably attached thereto via use of fasteners 12 and nuts 13. The numbering, configuration, and placement of the connectors 30, 40 may vary in different embodiments and should not be construed as limited by the exemplary figures.

As best shown in FIG. 3, the first connector 30 extends from the rear end 24 of the spread bar 20 at or adjacent to its first side 21. The second connector 40 extends from the rear end 24 of the spread bar 20 at or adjacent to its second side 22. The first connector 30 and second connector 40 may each comprise various configurations and should not be construed as limited to the configuration shown in the exemplary figures.

In a preferred embodiment as shown in the figures, the first connector 30 includes a front end 31 and a rear end 32. The first connector 30 includes a vehicle connector portion 33 which is adapted to removably connect to a vehicle 11. The vehicle connector portion 33 is positioned at the rear end 32 of the first connector 30 and includes a receiver 34 adapted to receive a hook or other connecting object extending from the vehicle 11. The receiver 34 is generally comprised of an aperture positioned adjacent to the rear end 32 of the first connector 30 as shown in the figures.

The first connector 30 also includes a connector mount portion 35 which is utilized to secure the first connector 30 to the first side 21 of the spread bar 20. The connector mount portion 35 extends from the vehicle connector portion 33 and is positioned at the front end 31 of the first connector 30. The connector mount portion 35 generally comprises an upper extension 36 and a parallel lower extension 37 which define a slot 38 therebetween.

The upper and lower extensions 36, 37 each include apertures 39, with the apertures 39 of the upper and lower extensions 36, 37 being in alignment with each other such that a single fastener 12 can extend through both the upper and lower extensions 36, 37. When the first connector 30 is secured to the spread bar 20, the apertures 39 of the first connector 30 are aligned with corresponding first connector receivers 25 on the first side 21 of the spread bar 20 as shown in the figures. Appropriate first connector receivers 25 may be selected in accordance with the needs of the vehicle 11 to which the present invention is being connected.

In a preferred embodiment as shown in the figures, the second connector 40 includes a front end 41 and a rear end 42. The second connector 40 includes a vehicle connector portion 43 which is adapted to removably connect to a vehicle 11. The vehicle connector portion 43 is positioned at the rear end 42 of the second connector 40 and includes a receiver 44 adapted to receive a hook or other connecting object extending from the vehicle 11. The receiver 44 is generally comprised of an aperture positioned adjacent to the rear end 42 of the second connector 40 as shown in the figures.

The second connector 40 also includes a connector mount portion 45 which is utilized to secure the second connector 40 to the second side 22 of the spread bar 20. The connector mount portion 45 extends from the vehicle connector portion 43 and is positioned at the front end 41 of the second connector 40. The connector mount portion 45 generally comprises an upper extension 46 and a parallel lower extension 47 which define a slot 48 therebetween.

The upper and lower extensions 46, 47 each include apertures 49, with the apertures 49 of the upper and lower extensions 46, 47 being in alignment with each other such that a single fastener 12 can extend through both the upper and lower extensions 46, 47 simultaneously. When the second connector 40 is secured to the spread bar 20, the apertures 49 of the second connector 40 are aligned with corresponding second connector receivers 26 on the second side 22 of the spread bar 20 as shown in the figures. Appropriate second connector receivers 26 may be selected in accordance with the needs of the vehicle 11 to which the present invention is being connected.

D. Tow Member

As shown throughout the figures, a tow member 50 extends from the front end 23 of the spread bar 20. In a preferred embodiment, the tow member 50 is positioned at a central location along the front end 23 of the spread bar 20. The tow member 50 may be removably attached to the spread bar 20 as shown in the figures or, in other embodiments, may be fixedly attached or integrally formed with the spread bar 20. The tow member 50 is adapted to connect to various objects to be towed or pulled by the vehicle 11, such as the hydraulic control system 15 shown in the figures.

The tow member 50 generally comprises a mount portion 51 adapted to be secured to the spread bar 20, such as via fasteners 12, and a tow loop 56 adapted to be connected to an object to be towed or pulled. The tow loop 56 may be comprised of various shapes, sizes, and configurations, and should not be construed as being limited by the exemplary figures.

As best shown in FIG. 3, the mount portion 51 includes an upper extension 52 and a lower extension 53 which extends parallel with respect to the upper extension 52 so as to define a slot 54 therebetween. Both the upper and lower extensions 52, 53 include apertures 55 which are aligned between the upper and lower extensions 52, 53 such that a fastener 12 may simultaneously extend through both of the extensions 52, 53 as well as the tow receivers 27 to secure the tow member 50 to the spread bar 20. The number and placement of the apertures 55 of the tow member 50 will generally match that of the tow receivers 27 of the spread bar 20 so that fasteners 12 and nuts 13 may be utilized to removably connect the tow member 50 to the spread bar 20.

E. Operation of Preferred Embodiment

In use, the connectors 30, 40 are first secured to the vehicle 11. Most vehicles 11 will have hooks or other mounting structures extending therefrom to which the connectors 30, 40 may be secured. The first connector 30 will be secured to the vehicle 11 using the receiver 34 of the vehicle connector portion 33 of the first connector 30, such as by positioning and securing the receiver 34 around a hook. The second connector 40 will similarly be secured to the vehicle 11 using the receiver 44 of the vehicle connector portion 43 of the second connector 40.

With the connectors 30, 40 extending in spaced-apart relationship from the vehicle 12 in a secure fashion, the spread bar 20 may be secured to the connectors 30, 40. The first side 21 of the spread bar 20 is inserted into the slot 38 of the connector mount portion 35 of the first connector 30. The apertures 39 of the connector mount portion 35 of the first connector 30 are aligned with corresponding first connector receivers 25 on the spread bar 20 and fasteners 12 and/or nuts 13 are utilized to secure the first side 21 of the spread bar 20 to the first connector 30.

With its first side 21 secured, the second side 22 of the spread bar 20 may then be inserted into the slot 48 of the connector mount portion 45 of the second connector 40. The apertures 49 of the connector mount portion 45 of the second connector 40 are aligned with corresponding second connector receivers 26 on the spread bar 20 and fasteners 12 and/or nuts 13 are utilized to secure the second side 22 of the spread bar 20 to the second connector 40.

With the spread bar 20 secured between the connectors 30, 40, the tow member 50 may be secured to the spread bar 20. The tow member 50 is positioned around the central portion of the spread bar 20, with the spread bar 20 being positioned into the slot 54 of the tow member 50. The apertures 55 of the tow member 50 will align with the tow receivers 27 of the spread bar 20 and fasteners 12 and/or nuts 13 may be utilized to secure the connection. An object such as a hydraulic control system 15 may then be connected to the tow loop 56 of the tow member 50 to be towed or pulled by the vehicle 11.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A tow hook connection system, comprising:
a first connector adapted to be secured to a vehicle;
a second connector adapted to be secured to said vehicle;
a spread bar secured between said first connector and said second connector; and
a tow member extending from said spread bar, wherein said tow member includes a mount portion and a tow loop extending from said mount portion, wherein said mount portion includes an upper extension, a lower extension, and a slot formed therebetween, and wherein said spread bar is positioned into said slot.

2. The tow hook connection system of claim 1, wherein said spread bar is removably secured between said first connector and said second connector.

3. The tow hook connection system of claim 1, wherein said tow member is removably secured to said spread bar.

4. The tow hook connection system of claim 1, wherein said first connector comprises a first vehicle connector portion and a first connector mount portion, wherein said second connector comprises a second vehicle connector portion and a second connector mount portion.

5. The tow hook connection system of claim 4, wherein said first vehicle connector portion includes a first receiver for connecting to said vehicle and wherein said second vehicle connector portion includes a second receiver for connecting to said vehicle.

6. The tow hook connection system of claim 5, wherein said first connector mount portion includes a first slot and wherein said second connector mount portion includes a second slot, wherein said spread bar is secured between said first slot and said second slot.

7. The tow hook connection system of claim 6, wherein said first connector mount portion includes a first plurality of apertures and wherein said second connector mount portion includes a second plurality of apertures.

8. The tow hook connection system of claim 7, wherein a first side of said spread bar includes a plurality of first connector receivers adapted to be aligned with said first plurality of apertures and wherein a second side of said spread bar includes a plurality of second connector receivers adapted to be aligned with said second plurality of apertures.

9. The tow hook connection system of claim 8, wherein said first connector receivers includes a plurality of rows of said first connector receivers and wherein said second connector receivers includes a plurality of rows of said second connector receivers.

10. The tow hook connection system of claim 1, wherein said upper extension includes a plurality of upper apertures and wherein said lower extension includes a plurality of lower apertures.

11. The tow hook connection system of claim 10, wherein said spread bar includes a plurality of tow receivers adapted to be aligned between said upper apertures and said lower apertures and further comprising fasteners for securing between said upper apertures, said tow receivers, and said lower apertures.

12. A tow hook connection system, comprising:
a first connector adapted to be secured to a vehicle;
a second connector adapted to be secured to said vehicle;
a spread bar secured between said first connector and said second connector; and
a tow member extending from said spread bar;
wherein said first connector comprises a first vehicle connector portion and a first connector mount portion, wherein said second connector comprises a second vehicle connector portion and a second connector mount portion;
wherein said first vehicle connector portion includes a first receiver for connecting to said vehicle and wherein said second vehicle connector portion includes a second receiver for connecting to said vehicle;
wherein said first connector mount portion includes a first slot and wherein said second connector mount portion includes a second slot, wherein said spread bar is secured between said first slot and said second slot.

13. The tow hook connection system of claim 12, wherein said spread bar is removably secured between said first connector and said second connector.

14. A tow hook connection system, comprising:
a first connector having a front end and a rear end adapted to be secured to a front of a vehicle, wherein said first connector includes a plurality of apertures near said front end of said first connector;
a second connector having front end and a rear end adapted to be secured to said front of said vehicle, wherein said second connector includes a plurality of apertures near said front end of said second connector;
a spread bar having a first side and a second side, wherein said spread bar includes at least two rows of apertures near said first side and at least two rows of apertures near said second side, wherein said apertures of said first connector are alignable with one of said at least two rows of apertures near said first side and wherein said apertures of said second connector are alignable with one of said at least two rows of apertures near said second side;
a plurality of fasteners extending through said apertures of said first connector, said apertures of said second connector and said apertures of said spread bar to secure said first connector and said second connector to said spread bar at a desired distance; and
a tow member extending from said spread bar, wherein said tow member has an opening adapted for receiving towing equipment.

15. The tow hook connection system of claim 14, wherein said at least two rows of apertures near said first side are parallel with respect to said first side and wherein said at least two rows of apertures near said second side are parallel with respect to said second side.

16. The tow hook connection system of claim 14, wherein said at least two rows of apertures near said first side are staggered with respect to one another and wherein said at least two rows of apertures near said second side are staggered with respect to one another.

17. The tow hook connection system of claim 14, wherein said front ends of said first connector and said second connector each include a slot for receiving said spread bar.

\* \* \* \* \*